United States Patent
Zinno et al.

(10) Patent No.: US 6,415,903 B1
(45) Date of Patent: Jul. 9, 2002

(54) CONTAINER TIPPING DEVICE AND ASSOCIATED METHOD

(76) Inventors: William Zinno, 15 Doulton Rd., Pittsburgh, PA (US) 15229; Leo John Bauer, Jr., 221 Forliview Rd., Glenshaw, PA (US) 15116

( * ) Notice: Subject to any disclaimer, the term of this patent is extended or adjusted under 35 U.S.C. 154(b) by 115 days.

(21) Appl. No.: 09/650,123

(22) Filed: Aug. 29, 2000

(51) Int. Cl.[7] .............................................. B65G 47/24
(52) U.S. Cl. ...................................... 198/408; 198/407
(58) Field of Search ................................ 198/406, 407, 198/408

(56) References Cited

U.S. PATENT DOCUMENTS

| | | | | |
|---|---|---|---|---|
| 2,128,192 A | * | 8/1938 | Risser | 198/407 X |
| 3,220,532 A | * | 11/1965 | Vamvakas | 198/408 |
| 3,625,336 A | * | 12/1971 | Fuwa et al. | 198/407 |
| 3,643,780 A | * | 2/1972 | Shimogaki et al. | 198/408 |
| 4,062,441 A | * | 12/1977 | Jendrichowski | 198/408 X |
| 4,141,193 A | * | 2/1979 | Joa | 198/408 X |
| 5,038,917 A | * | 8/1991 | Kronseder | 198/408 X |

FOREIGN PATENT DOCUMENTS

| | | | | |
|---|---|---|---|---|
| JP | 135026 | * | 10/1980 | 198/408 |
| RU | 521219 | * | 10/1976 | 198/408 |

* cited by examiner

*Primary Examiner*—James R. Bidwell
(74) *Attorney, Agent, or Firm*—David C. Jenkins; Eckert Seamans Cherin & Mellott, LLC

(57) ABSTRACT

A tipping device for reorienting vertical containers in a horizontal orientation which includes, a lift structured to lift a container, a transfer assembly having two transfer members and a gap there between. The transfer members each have a generally convex portion and an elongated, generally horizontal portion. the generally convex portion is disposed at an elevation that is lower than the generally horizontal portion. The lift slides a container over the generally convex portion onto the generally horizontal portion causing the orientation of the container to change from vertical to generally horizontal.

17 Claims, 3 Drawing Sheets

CONTAINER TIPPING DEVICE AND ASSOCIATED METHOD

BACKGROUND OF THE INVENTION

1. Field of the Invention

This invention relates to container processing machines and more specifically to a device to tip containers from a vertical position to a horizontal position.

2. Description of the Prior Art

During the processing of containers, for example food containers, such containers are typically transported between various processing machines by conveyors. Different processing machines may require the containers to be at a different orientation, e.g. horizontal or vertical, to be processed. A device for turning a container from vertical to horizontal is called an tipping device.

Prior art tipping devices included a drum having a plurality of plastic fingers extending therefrom. The fingers were typically arranged in rows which extended in an axial direction along the surface of the drum. The rows were spaced evenly around the circumference of the drum. The individual fingers extended radially outwardly from the outer surface of the drum. A lower conveyor fed containers in a vertical orientation to a location next to the drum. Chutes were used to align the containers with the fingers. The bottom surface of the chute would have a slot sized to allow a finger to pass therethrough. As the drum rotated, the fingers would come from below the containers, pass through the slot, and lift the container. At the top of the drum, the containers were in a horizontal orientation. At this point the containers were transferred to a take-away conveyor.

The take-away conveyor consisted of conveyor belts formed of long concave trays, or carrier trays. The trays were structured to have a plurality of containers lay horizontally within each carrier tray. Like the chutes that fed the tipping device, each carrier tray had a slot that allowed the finger to pass therethrough. The conveyor belt moved intermittently in a direction parallel to the axis of the tipping device drum, that is, perpendicular to the direction of travel of the fingers. The intermittent movement of the conveyor and the rotation of the drum was timed so that while the conveyor is being advanced the drum fingers are not within the plane of the carrier trays. For each intermittent advance of the conveyor, one container was delivered by the tipping device to each carrier tray. Therefore, when the carrier trays form a conveyor with each tray filled with a plurality of containers, for each intermittent movement of the conveyor, each carrier tray received one container from the tipping device.

As such, timing of the advancement of the conveyor belt with the rotation of the drum was critical as the finger must pass through the slot while the conveyor belt was paused. If the belt was not positioned to allow a finger to pass through the slot, the finger would collide with the carrier tray damaging the finger. Alternately, if the finger was within the slot as the belt advances, the belt would contact the finger resulting in damage.

In addition to the possibility of damage to the carrier tray and/or drum fingers, the prior art tipping device had different sized fingers which corresponded to a certain size of container. Thus, the tipping device could not be used with different sized containers in a single batch. Replacing the fingers with fingers of a different size was a time consuming process.

Therefore, there is a need for a tipping device that is not subject to damage from a take-away conveyor.

There is also a need for a tipping device that will not damage the take-away conveyor.

SUMMARY OF THE INVENTION

The above described needs, and others, have been met by the present invention. The present invention provides for an tipping device having a transfer assembly, a lifting means, and a striker assembly. The transfer assembly has two members each with a generally convex arcuate portion and an elongated, generally horizontal portion. The members are spaced apart by about one to two inches. The inner surfaces of the members may be flared about 45 degrees. The lower end of the generally convex portions are located at the end of a transport means, which is typically a conveyor belt. The lower ends of the generally convex portions are angled about 25 to 40 degrees from vertical. The generally convex portion arches upwardly and curves until the surface is generally horizontal. The horizontal portion of the transfer member is integral to, and extends from, the horizontal end of the generally convex portion.

The tipping device further includes a lifting means which is, preferably, a rotatable disk having lifter member extending therefrom. The lifter members are preferably rubber finger-like extensions. The disk is positioned so that the fingers extend through the gap between the transfer assembly members, adjacent to the end of the first transfer means. The curvature of the outer surface of the disk is generally the same as the curvature of the convex surface. Thus, the fingers extend through the gap between the convex members throughout the length of the generally convex portion of the transfer members. The fingers do not extend through the gap between the transfer assembly members along the horizontal portion.

The tipping device further includes a striker assembly having a rotatable member and striker members. Preferably, the rotatable member has two ends and a central pivot. A striker member is located on each end. The rotatable member is mounted on a rotating shaft and disposed above the horizontal portion of the transfer assembly members. The striker members are preferably made from a soft, resilient material such as rubber.

The tipping device works in conjunction with a first transport means which delivers vertical containers to the transfer members and a second transport means which carries away the horizontal vertical containers.

In operation, the first transport means feeds a vertically oriented container into the gap between transfer assembly members. Where the first transfer means is an endless belt conveyor and the transfer assembly is located adjacent to one end of the conveyor, gravity will pull the container downward over the edge of the conveyor where it will be supported by the transfer members. When the container is in place at the lower ends of the transfer members, the rotatable disk is rotated bringing a finger-like member up from below the container, lifting the container along the generally convex portion. The surface or the generally convex portion causes the orientation of the container to change from vertical to horizontal. As the container slides along the horizontal portion of the transfer members, the finger on the rotating disk is drawn below the transfer members. At this point, the striker assembly is actuated, causing the rotatable member to rotate a striker member into contact with the bottom of the container. The force imparted by the striker member causes the container to slide along the horizontal member into the second transport means. Preferably, the second transport means includes a carrier tray conveyor. The tipping device may be structured to work intermittently. Because the tipping device operates without the use of fingers that pass through the carrier tray, the tipping device is not subject to damage therefrom.

It is an object of this invention to provide a tipping device that reduces damage from the take-away conveyor.

It is a further object of this invention to provide a tipping device which is compatible with existing feeder devices.

It is a further object of this invention to provide a tipping device having a transfer member with a generally convex portion and an elongated, generally horizontal portion.

It is a further object of this invention to provide a tipping device having a rotating disk with fingers extending therefrom, where the fingers are structured to extend through the transfer member generally convex portion, but not through the entire elongated, generally horizontal portion.

It is a further object of this invention to provide a tipping device having a striker assembly.

It is a further object of this invention to provide a tipping device where the striker assembly contacts the containers on the generally horizontal portion of the transfer member and causes the containers to travel to the take-away conveyor.

It is a further object of this invention to provide an assembly line having a tipping device with a transfer member with a generally convex portion and an elongated, generally horizontal portion.

It is a further object of this invention to provide a method of tipping containers from a vertical orientation to a horizontal orientation.

It is a further object of this invention to provide a method of tipping containers using a transfer member having a generally convex portion and an elongated generally horizontal portion.

These and other objects of the invention will be more fully understood from the following description of the invention in reference to the illustrations appended hereto.

DESCRIPTION OF THE PREFERRED EMBODIMENTS

As used herein, "generally convex portion" is intended to include a structure having a generally arcuate shape, even if the structure is constructed of a series of straight members each coupled to another at an angle.

Figure 1:
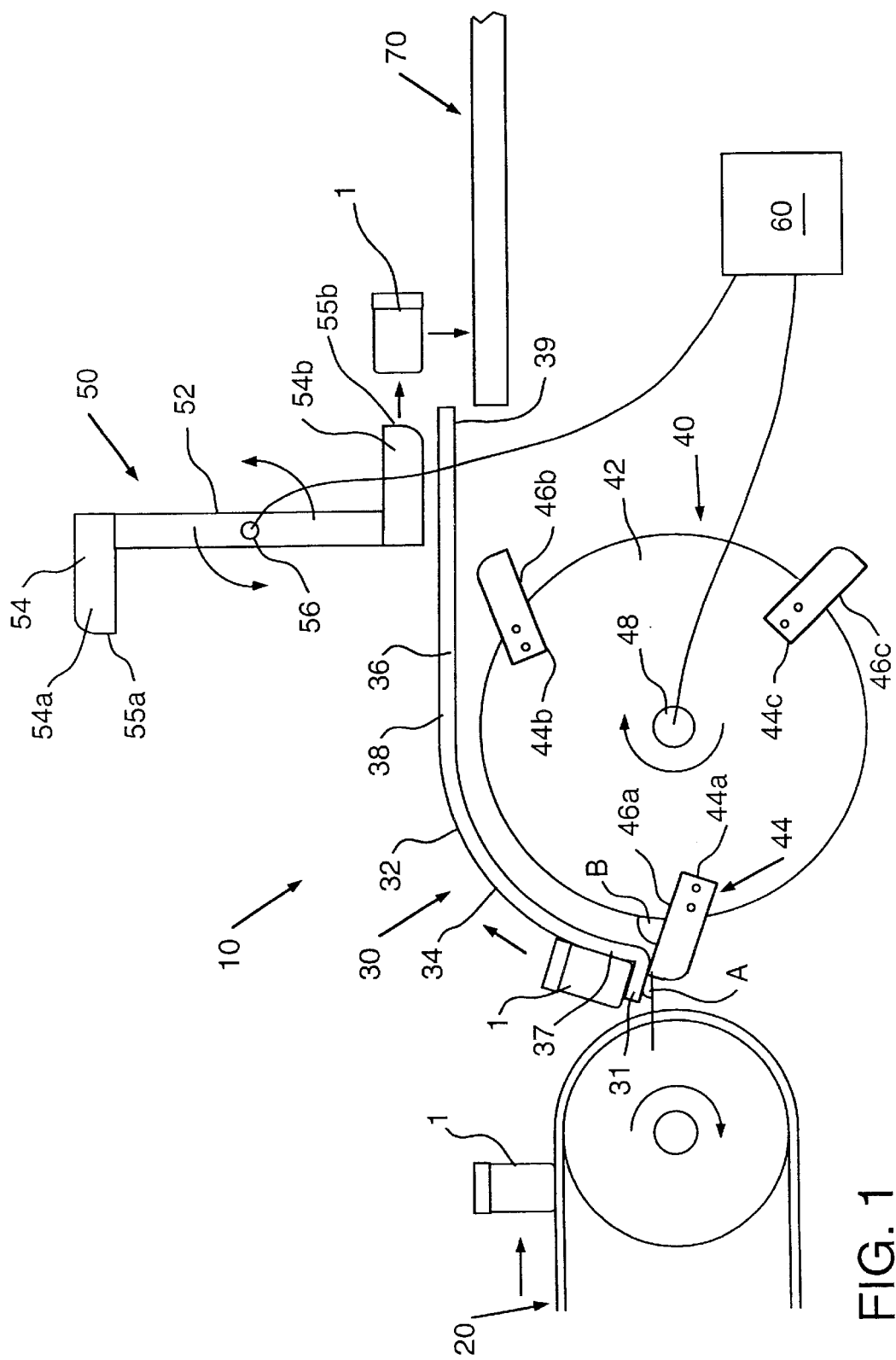
FIG. 1 shows a schematic elevational view of a tipping device.

FIG. 1 shows a schematic elevational view of a tipping device 10 according to the present invention. The tipping device 10 includes a transfer assembly 30, a lifting means 40 and a striker assembly 50. The tipping device 10 works in conjunction with a first transport means 20, and a second transport means 70. The first transport means 20 may be an endless belt conveyor, which is known in the prior art. The first transport means 20 is located on a first level and carries containers 1 in a generally vertical orientation. The second transport means 70 may be but is not limited to, a carrier tray conveyor. The second transport means 70 is at a second, higher level and transports the containers 1 in a generally horizontal orientation. In the preferred embodiment, the first transport means 20 and the second transport means 70 are generally horizontal. However, either or both the first or second transport 20, 70 means can be at an angle up to fifteen degrees.

Figure 2:
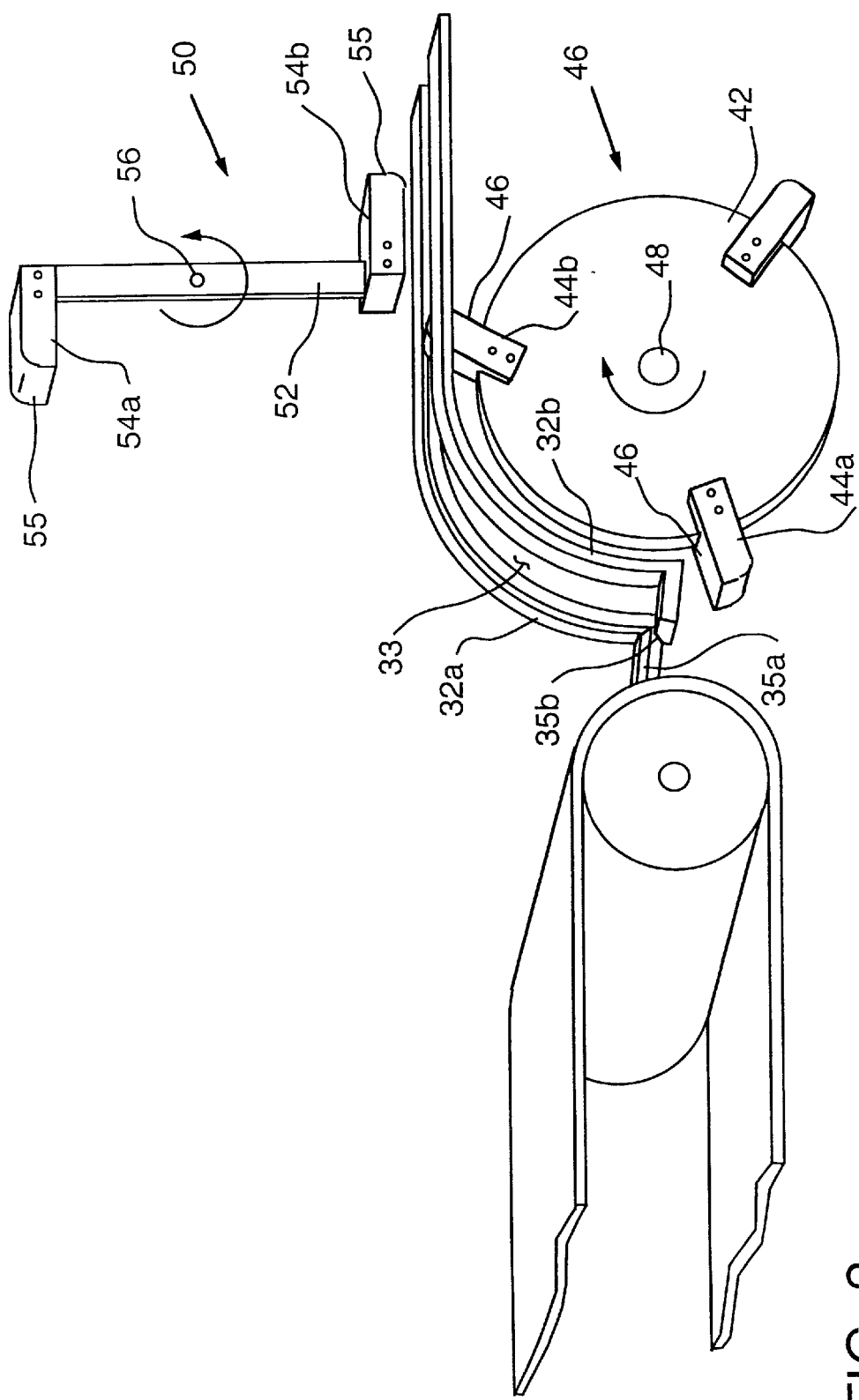
FIG. 2 shows an isometric view of a tipping device.

The transfer assembly 30 includes two (see FIG. 2 for isometric view) transfer members 32 having a generally convex portion 34 and an elongated, generally horizontal portion 36. The generally convex portion 34 is disposed at a lower elevation than the generally horizontal portion 36. The generally horizontal portion 36 extends in a direction generally tangential to the generally convex portion 34. The transfer member 32 may include a support tab 31 to hold a container 1 after it is delivered to the transfer assembly 30 by first transport means 20. As shown on FIG. 2, two transfer members 32a and 32b are maintained in a spaced relation having a gap 33, therebetween. The transfer members 32a, 32b (FIG. 2) have an upper-inner surface 35a and 35b disposed adjacent to the gap 33. The upper-inner surfaces 35a, 35b may be flared 30–70 degrees. Such flared surfaces 35a, 35b aid in maintaining the container 1 within the gap 33 as the container 1 is lifted as described below.

Also, as shown on FIG. 1, in the preferred embodiment, the generally convex portion 34 is shaped as an circular arc. The circular arc has a lower end 37 and an upper end 38. The lower end 37 is disposed adjacent to first transport means 20. The lower end 37 is at an angle, angle "A," of about 25–40 degrees from horizontal. The generally horizontal portion 36 has a distal end 39 opposite the generally convex portion 32. The distal end 39 is disposed above and adjacent to second transport means 70.

Lifting means 40 is, preferably, a disk 42 having at least one extension, or finger 44, extending therefrom. In the preferred embodiment there are three fingers 44a, 44b, 44c, extending from disk 42 spaced about 120° apart. Of course, a disk 42 may have any number of fingers 44 extending therefrom, e.g. four fingers spaced about 90 degrees apart. The disk 42 has a radius that is slightly smaller than the radius of generally convex portion 34. The fingers 44a, 44b, 44c each have a lifting surface 46a, 46b, 46c. A lifting surface 46a, 46b, 46c is at an angle, angle "B," of about 90°–75°, and preferably 80°, to the peripheral edge of disk 42. The plane of the disk 42 is aligned with the gap 33 so that fingers 44a, 44b, 44c extend into the gap 33. The disk is rotatably mounted on an shaft 48. The fingers 44a, 44b, 44c are, preferably, made from a resilient material such as, but not limited to, rubber.

The striker assembly 50 includes a rotatable member 52 and striker members 54 attached thereto. The rotating member 52 rotates in a plane that is generally aligned with the gap 33. In the preferred embodiment, rotatable member 52 is a straight bar having one striker members 54a and 54b located at either end. The striker member 54 extends generally perpendicular to the rotating member 52 and in the direction of rotation. Each striker member has a striking surface 55a, 55b. The rotatable member 52 is coupled to a shaft 56. The striker members 54a, 54b are preferably made from a soft, resilient material such as rubber. The striker assembly 50 is positioned above the transfer member's horizontal portion 36 so that when the rotatable member 52 is generally vertical, a striker member striking surface 55a, 55b is proximal to horizontal portion distal end 39.

In operation, as shown on FIG. 1, a container 1 in a vertical orientation will be carried on first transport means 20 towards transfer assembly 30. As the container 1 begins to fall off the end of transport means 20, the container 1 lands on support tab 31 at the generally convex portion lower end 37. When a container 1 is in place at the generally convex portion lower end 37, lifting means 40 is actuated so that disk 42 rotates on shaft 48, clockwise as shown on FIG. 1. A finger lifting surface 46a, 46b, 46c contacts the bottom of the container 1 and, as the finger 44 travels between the gap 33 in the generally convex portion 32, the finger 44 lifts the container 1 along generally convex portion 32. As the container 1 moves over the generally convex portion 32, the orientation of the container changes so that, upon reaching the upper end 38, the container 1 will be horizontal. When the container 1 reaches the generally convex portion upper end 38, rotation of disk 42 will cause the finger 44 to drop below the generally horizontal portion 36. That is, the finger does not travel in the gap between transfer members through the length of the generally horizontal portion 36. The container 1 will remain on the horizontal portion 36, and, may have enough momentum to slide a short distance on the horizontal portion 36. When the container 1 is on the horizontal portion 36, the striker assembly 50 is actuated. When the striker assembly 50 is actuated, the rotatable member 52 is rotated on shaft 56 in a counter-clockwise direction as shown on FIG. 1. A striking surface 55a, 55b will contact the bottom of the container 1 causing the container 1 to slide off the horizontal portion distal end 39. The container 1 will slide/fall onto the second transport means 70 where it may be transported away for further processing.

The lifting means 40 and the striker assembly 50 may be coupled to a control means 60 that causes the lifting means 40 and the striker assembly 50 to operate intermittedly. The control system 60 may be mechanical, i.e. a system of cams, gears and axles, electrical, i.e. an electronic control actuating the shafts 48, 56, or a combination thereof. The control means 60 will cause the lifting means 40 to actuate to lift a container 1 on to horizontal portion 36, then cause striking means 50 to actuate to deliver the container 1 to the second transport means 70. The control means 60 may be based on a timer or may include a sensor that senses the location of the container 1.

Both the lifting means 40 and the striker assembly 50 have a "rest" position where either disk 42 or rotatable member 52 is not in motion. The rest position for the lifting assembly occurs when a finger 44 is just below support tab 31. In the preferred embodiment, when one finger 44a (as shown) is just below support tab 31, another finger 44b (as shown) is just below generally horizontal portion 36. The rest position for the striker assembly 50 occurs when the rotatable member 52 is generally horizontal.

Alternately, this invention may be practiced without a striker assembly 50. In this configuration the horizontal portion 36 of transfer members 32 is shorter and the disk 42 rotates at a faster speed. By rotating at a faster speed, the disk 42 imparts a sufficient speed to the containers 1 to slide the containers 1 over the shortened horizontal portion 36.

This invention may be practiced with containers made from a variety of materials such as glass, metal or plastic or any combination thereof. The containers may be, but are not limited to, bottles, jars, or cans or any combination thereof. The containers may be of any size, or weight but the preferred embodiment handles containers of between about 2.5 fluid ounces and 6.0 fluid ounces. The containers may have any shape, but are preferably cylindrical, or have a cylindrical portion. Finally, the containers are preferably empty, but the invention may be practiced with filled containers as well.

Figure 3:
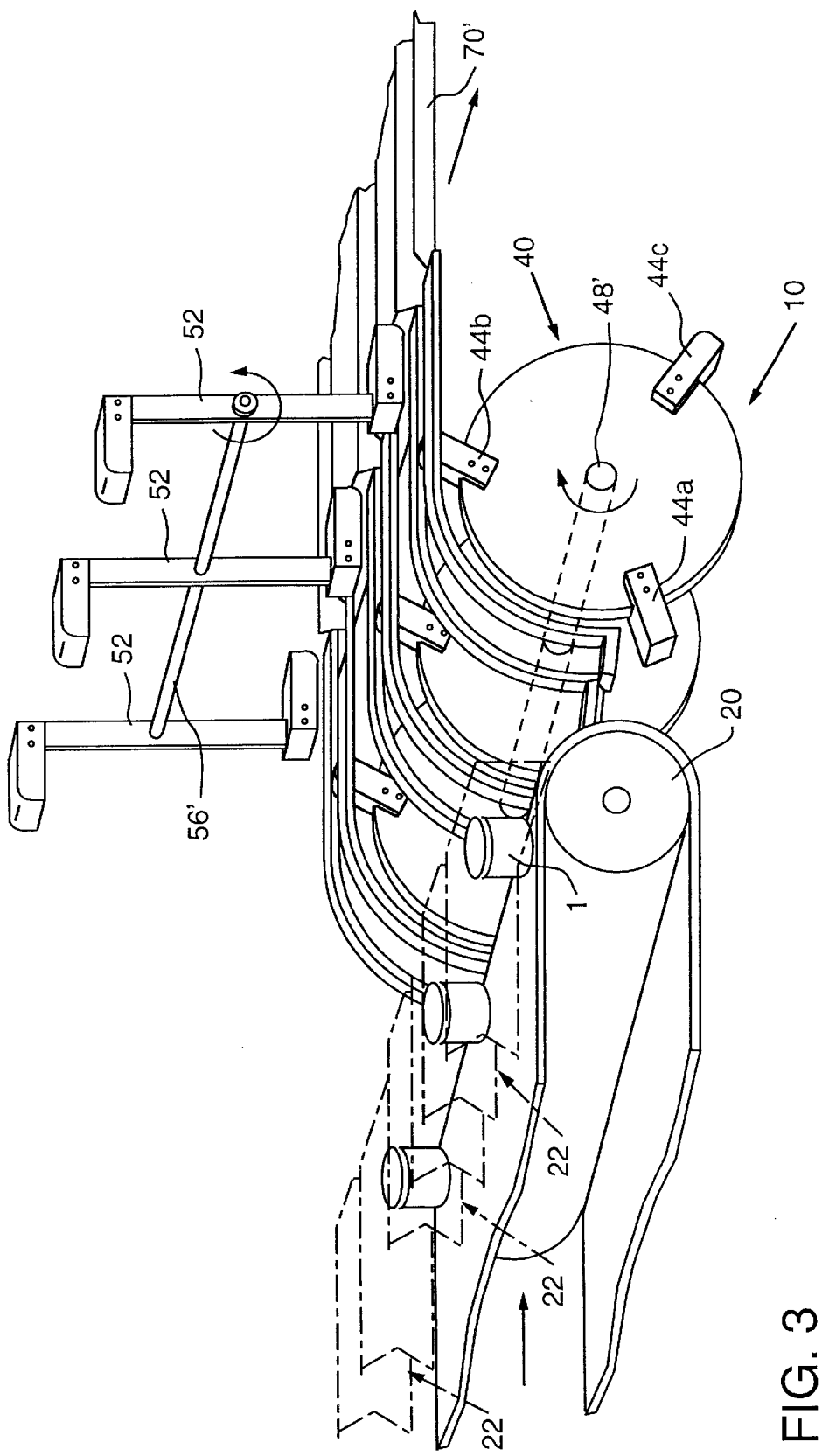
FIG. 3 shows a plurality of tipping devices in parallel.

As shown in FIG. 3, this invention may be practiced with a plurality of tipping devices 10 operating in parallel. As shown, a plurality of tipping devices 10 may be positioned adjacent to each other. A common shaft 48' extends through each lifting means disk 42. Alternatively, the disks 42 my be integral to each other, forming a drum. A common shaft 56' extends through each striker assembly 50. The two shafts 48' and 56' are generally parallel. The fingers 44a, 44b, 44c on each disk 42 are aligned the fingers 44a, 44b, 44c of an adjacent disk 42. The rotating member 52 of each striker assembly 50 is aligned with the adjacent rotating member 52. Containers are delivered to the tipping devices 10 by an endless loop conveyor 20. The containers are aligned with each tipping device 10 by a plurality of chutes 22. The centerline of each chute 22 is aligned with the centerline of the gap 33 of the associated tipping device. The second transport means is a carrier tray conveyor 70' which moves in a direction parallel to shafts 48' and 56'.

In operation, a plurality of containers are transported by conveyor 20 towards the plurality of tipping devices 10. The plurality of chutes 22 align on container in a row of containers with each tipping device 10. When shaft 48' rotates, an entire row of containers is lifted along each tipping device transfer assembly 30 into the horizontal position. When shaft 56' rotates, the row of containers is delivered onto the carrier tray conveyor 70. The carrier tray conveyor may be coupled to the control means 60 so that the carrier tray conveyor 70 advances intermittently with the actuation of the lifting means 40.

While certain embodiments of the invention have been described herein for the purpose of illustration, it will be evident to those skilled in the art that numerous variations of the details may be made without departing from the invention as described in the following claims. For example, instead of a carrier tray conveyor as the second transport means, the containers could be delivered, in the horizontal orientation, along a slide to another machine, such as a labeling machine. Accordingly, the particular arrangement disclosed is meant to be illustrative only and not limiting as to the scope of the invention which is to be given the full breath of the appended claims and any and all equivalence thereof.

What is claimed is:

1. A tipping device for reorienting vertical containers in a horizontal orientation, said device comprising:

a lifting means structured to lift a container;

a striker assembly;

a transfer assembly having two transfer members and a gap therebetween;

said transfer members each have a generally convex portion and an integral elongated, generally horizontal portion;

said generally horizontal portion extending in a direction generally tangential to said generally convex portion; and wherein said lifting means slides a container over said generally convex portion onto said generally horizontal portion causing the orientation of said container to change from vertical to generally horizontal.

2. The tipping device of claim 1 wherein said striker assembly comprises:

a rotating member;

at least one striker member;

said at least one striker member attached to said rotating member.

3. The tipping device of claim 2 wherein said rotating member rotates in a plane generally aligned with said gap.

4. The tipping device of claim 3 wherein said at least one striker member includes a striking surface structured to contact said containers.

5. The tipping device of claim 4 wherein:

said transfer member horizontal portions include a distal end; and said striker assembly is disposed so that when said rotating member is in a generally vertical position, said striking surface is proximal to said distal end.

6. The tipping device of claim 2 herein:

said rotating member has two ends; and there is one said striking member at each end.

7. The tipping device of claim 6 wherein said at least one striker member includes a striking surface structured to contact said containers.

8. The tipping device of claim 7 wherein:

said transfer member horizontal portions include a distal end; and said striker assembly is disposed so that when said rotating member is in a generally vertical position, said striking surface is proximal to said distal end.

9. An assembly line comprising:

a first transport means for transporting containers in a vertical orientation;

a lifting means structured to lift a container;

a transfer assembly having two transfer members and a gap therebetween;

said transfer members each have a generally convex portion and an integral elongated, generally horizontal portion;

said generally convex portion disposed below said horizontal portion;

a second transport means for transporting containers in a horizontal orientation;

said first transport means disposed adjacent to said generally convex portion;

a striker assembly disposed adjacent to said horizontal portion;

said second transport means disposed adjacent to said horizontal portion; and wherein said lifting means slides a container over said generally convex portion onto said generally horizontal portion causing the orientation of said container to change from vertical to generally horizontal.

10. The assembly line of claim 9 wherein:

said striker assembly comprises:

a rotating member;

at least one striker member;

said at least one striker member attached to said rotating member.

11. The assembly line of claim 10 wherein said rotating member rotates in a plane generally aligned with said gap.

12. The assembly line of claim 10 wherein said at least one striker member includes a striking surface structured to contact said containers.

13. The assembly line of claim 12 wherein:

said transfer member horizontal portions include a distal end; and said striker assembly is disposed so that when said rotating member is in a generally vertical position, said striking surface is proximal to said distal end.

14. The assembly line of claim 10 wherein:

said rotating member has two ends; and there is one said striking member at each end.

15. The assembly line of claim 14 wherein said at least one striker member includes a striking surface structured to contact said containers.

16. The assembly line of claim 15 wherein:

said transfer member horizontal portions include a distal end; and said striker assembly is disposed so that when said rotating member is in a generally vertical position, said striking surface is proximal to said distal end.

17. A method of tipping a vertically oriented container comprising the steps:

(a) providing a first transport means at a first level;

(b) providing a transfer assembly having two transfer members each with a generally convex portion and an elongated horizontal portion;

(c) providing a second transport means at a second level which is higher than said first level and disposed adjacent to said horizontal portion;

(d) providing a lifting means; and (e) transporting generally vertically oriented on said first transport means passing said containers over said transfer members by lifting said containers over said transfer assembly using said lifting means, thereby causing said containers orientation to be changed vertical to horizontal;

(f) providing a striker assembly having a rotatable member having two ends and striker members located at each send end; and (g) rotating sa id rotatable members so that said striking members contact said container on said horizontal portion, causing said containers to travel from said horizontal portion o n to said second transport means; and (h) transporting generally horizontal oriented containers on said second transport means.

* * * * *

UNITED STATES PATENT AND TRADEMARK OFFICE
CERTIFICATE OF CORRECTION

PATENT NO. : 6,415,903 B1
DATED : July 9, 2002
INVENTOR(S) : William Zinno et al.

It is certified that error appears in the above-identified patent and that said Letters Patent is hereby corrected as shown below:

Column 6,
Line 17, "on" should read -- each --.

Column 7,
Line 7, "herein" should read -- wherein --.

Signed and Sealed this

Third Day of December, 2002

JAMES E. ROGAN
*Director of the United States Patent and Trademark Office*